(12) United States Patent
Mangum

(10) Patent No.: US 6,234,074 B1
(45) Date of Patent: May 22, 2001

(54) PACKAGED FOOD FLUID EXTRACTOR

(76) Inventor: Steven Mangum, 3419 Via Lido, #224, Newport Beach, CA (US) 92663

( * ) Notice: Subject to any disclaimer, the term of this patent is extended or adjusted under 35 U.S.C. 154(b) by 0 days.

(21) Appl. No.: 09/262,775

(22) Filed: Mar. 4, 1999

Related U.S. Application Data

(63) Continuation-in-part of application No. 09/058,789, filed on Apr. 13, 1998, now abandoned.

(51) Int. Cl.$^7$ .................................................. B30B 9/06
(52) U.S. Cl. ............................ 100/110; 100/116; 100/234
(58) Field of Search ............................. D7/666; 100/110, 100/116, 234

(56) References Cited

U.S. PATENT DOCUMENTS

| | | | |
|---|---|---|---|
| D. 324,156 | 2/1992 | Shun | D7/666 |
| D. 342,649 | 12/1993 | Miller et al. | D7/666 |
| D. 358,304 | 5/1995 | Hoddinott | D7/666 |
| 952,519 | 3/1910 | Gilchrist | 100/234 |
| 5,513,562 | 5/1996 | Moor | 100/234 |
| 5,551,741 | 9/1996 | Laboccetta | 100/234 |

Primary Examiner—Peter Vo
Assistant Examiner—Louis K. Huynh
(74) Attorney, Agent, or Firm—Dennis Beech

(57) ABSTRACT

The packaged food fluid extractor has a container lever attached to a compression lever at a pivot point such that when the two are squeezed together compression of food in a food container extracts fluids from the foods. The compression lever has a piston attached with a perforated disk attached at the bottom end located to allow insertion in the top of an open food container. When such food container is placed in the recess of the container lever and the perforated disk is located on top of the food contents, the squeezing of the two levers together, similar to pliers, compresses the food and fluids are extracted.

5 Claims, 3 Drawing Sheets

PACKAGED FOOD FLUID EXTRACTOR

This application is a continuation-in-part of U.S. patent application Ser. No. 09/058,789 filed on Apr. 13, 1998, now abandoned.

BACKGROUND OF THE INVENTION

1. Field of the Invention

This invention relates to devices used to remove, extract, or squeeze fluids from a substance. The new device allows extracting fluids from a substance while in its container.

2. Description of Related Art

There are currently in use many devices for extracting fluids from a substance. The most commonly known of these are the familiar juicer for the removal of juice from fruits and vegetables. In the most common of these a piece of fruit is cut in half and the exposed internal elements are pressed onto a properly shaped convex device to compress the fruit tissue and force out the juice.

When food is stored in a container, it may be of a substance which naturally has some fluid content or it may have fluids added as part of the packaging process. In such cases, when the purchaser or user wishes to consume the food, extraction of any absorbed fluids may be desired. The normal process is to use a strainer to allow the fluids to be removed. An example of such a fluid removal device is disclosed in U.S. Pat. No. 337,702 which is a hand held strainer. To remove fluids from food, such as tuna which has water, oil and the like absorbed in the fish, while the food is still in its container, a disk which is sized to fit the diameter of a can or jar and which has perforations to pass fluids is used with a handle for the user to hold the disk. The disk is then pressed against the tuna in the can thereby compressing the tuna solids and forcing out fluids. This operation provides no leverage for the user to compress the tuna and is awkward to use as fluids will naturally come into contact with the user.

A further refinement of this process is the use of a disk having perforations which disk is attached to one of two lever arms. An example of such a device is disclosed in U.S. Pat. No. Des. 342,649 issued Dec. 28, 1993. This configuration provides a means of leverage in pressing contents of canned goods to for example remove fluids. The device does not allow for a change in shape or size of the disk for variable diameter cans. Also, because of the short length of the upper lever arm between the pivot point and the perforated disk mounting point, the hand grip end of the lever arm must be raised a significant distance to insert the can and begin compressing. This may make it awkward or difficult to squeeze the levers together with one hand.

The present invention uses a simple lever mechanism to provide leverage for compression of food in a container and to avoid extracted fluids coming into contact with the user. The packaged food fluid extractor has a container lever arm to hold the food container such that a perforated disk on a compression lever arm may be forced into the container to compress the food by the user squeezing their hand about the lever arms similar to the use of a pair of pliers. The lever arms provide leverage for compression of the food and isolation from the extracted fluids to avoid contact with the user.

One embodiment of the invention extends the length of the pivot element of the compression lever to increase the distance from the mounting point of the perforated disk to the pivot point on the compression lever to reduce the rotational movement necessary to insert a container and press the contents thereof. This provides for easier single hand griping and squeezing together of the levers. A stepped platform may also be provided as part of the container lever platform to accommodate different diameter containers.

SUMMARY OF THE INVENTION

One object of the present invention is to improve the ability to use food containers in combination with a leveraged food fluid extractor for compression of the food contained therein for extraction of fluids. Another object is simple user hand operation to apply the force to extract fluid from food in a container. A further object is to distance the user from the food container such that extracted fluid does not necessarily contact the user.

In accordance with the description presented herein, other objectives of this invention will become apparent when the description and drawings are reviewed.

DESCRIPTION OF THE PREFERRED EMBODIMENT

The package food fluid extractor has a container lever rotatably attached and planar with a compression lever. There is a piston with a perforated disk attached to the compression lever. When a can is placed on the container lever platform and the perforated disk is inserted in the container over the food contents, the user may grip the lever arms to squeeze fluid from the food.

Figure 1:
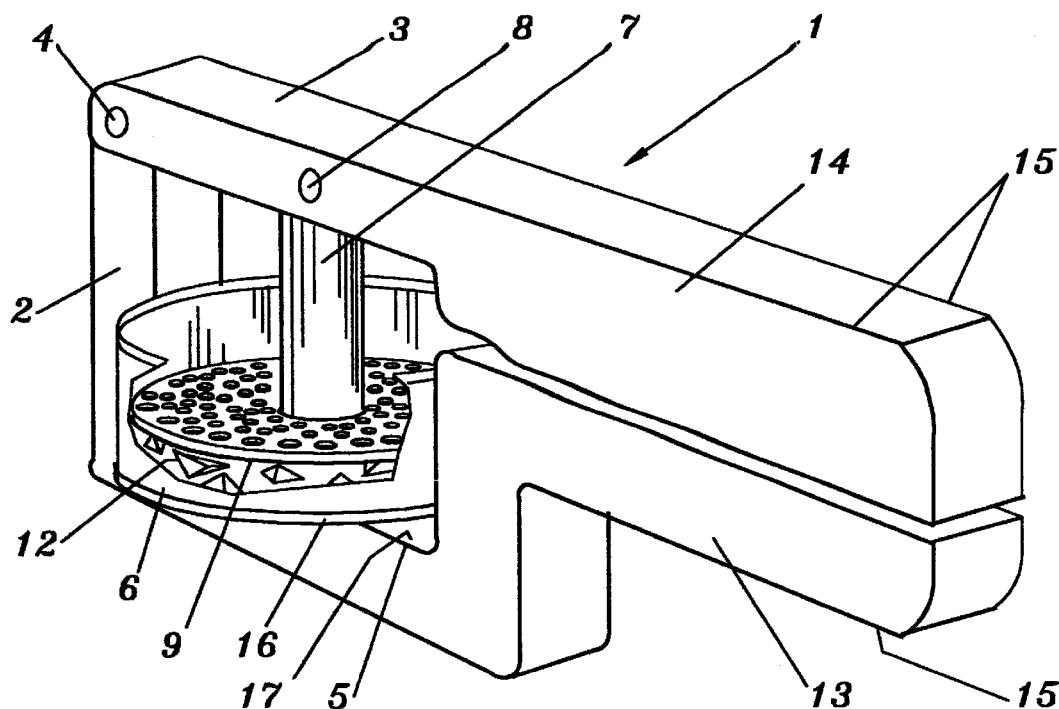
FIG. 1 illustrates a perspective elevation view of the packaged food fluid extractor with a cut away view of a can.
Figure 2:
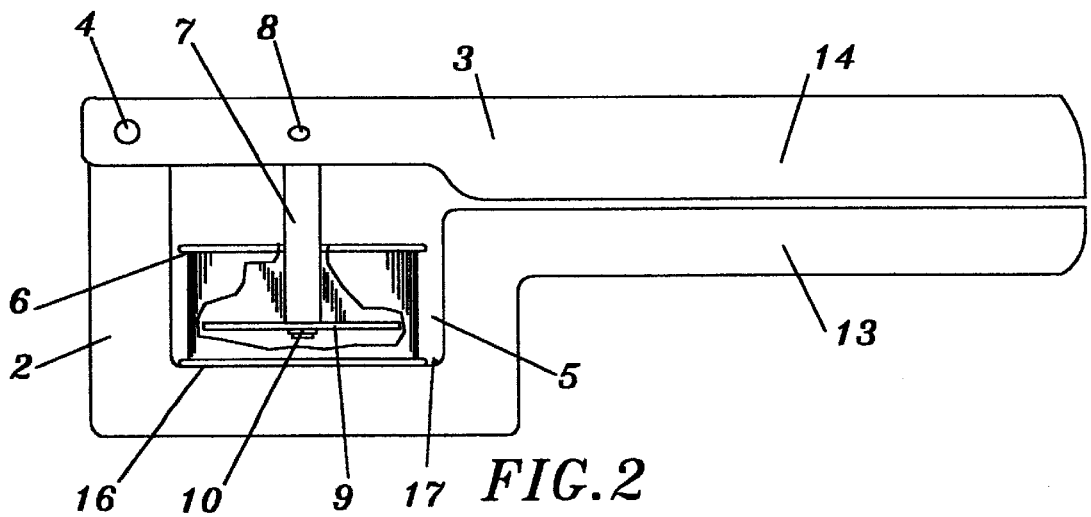
FIG. 2 illustrates a side elevation view of the invention with a can mounted therein
Figure 3:
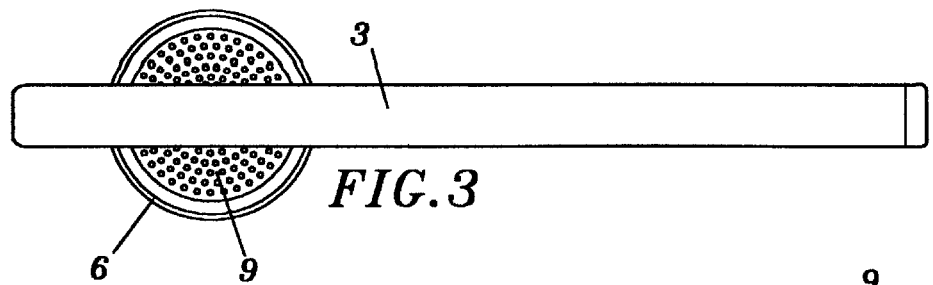
FIG. 3 illustrates a top view of the fluid extractor and a can mounted therein.
Figure 4:
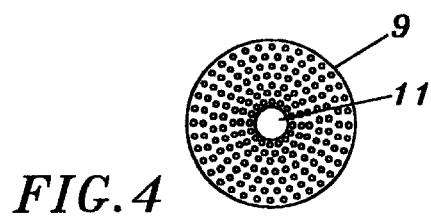
FIG. 4 illustrates top plan view of a perforated disk.

Referring to FIGS. 1 through 3, the packaged food fluid extractor (1) has a container lever (2) rotatably attached about pivot point (4) to a compression lever (3). The container lever (2) has recess (5) into which a food container (6) may be placed on platform (17). The food container (6) may be a can, jar, cup or the like.

The compression lever (3) has a piston (7) rotatably attached by pin (8). The piston (7) has a perforated disk (9) attached at its bottom end (10). The perforated disk (9) is illustrated mounted by force of friction to the bottom end (10) which has a variable diameter shaft. This allows for use of differing diameter perforated disks (9) to be attached to the piston (7) to accommodate varying diameter food containers (6). Other shapes of perforated disks (9) may be used such as oval, octagonal and the like to fit a particular food container (6). Obviously other means of attachment may also be used as for example the bottom end (10) may have one diameter for attaching different outside diameter perforated disks (9) all of which have the same attachment aperture (11) dimension. Also a screw may be used for attachment rather than a friction fit.

With the lid removed or top opened, the food container (6) is placed in the recess (5) on platform (17), the perforated disk (9) is then inserted into the top of the food container (6) to rest on the food (12) contents as for example canned fish. The user then grips the lever arms (13,14) to squeeze levers (2,3) together thus compressing the food (12) in the food container (6). Fluid is thereby extracted from the food (12) and the fluid extractor (1) may then be tilted or inverted to drain the fluids.

The packaged food fluid extractor (1) may be constructed of metal, plastic or other suitable material depending on the application. The levers (2,3) may be solid material or hollow with structural ribs for strength. The lever arms (13,14) may be rounded on edges (15) for comfort of the user. For a rigid flat perforated disk (9) a metal structure is preferred. For a typical can of tuna fish, levers (2,3) of ¾ inches width have been found suitable. For a normal food container (6) the recess (5) does not require an extended platform as the container bottom (16) is sufficient to handle the compression pressure.

Figure 5:
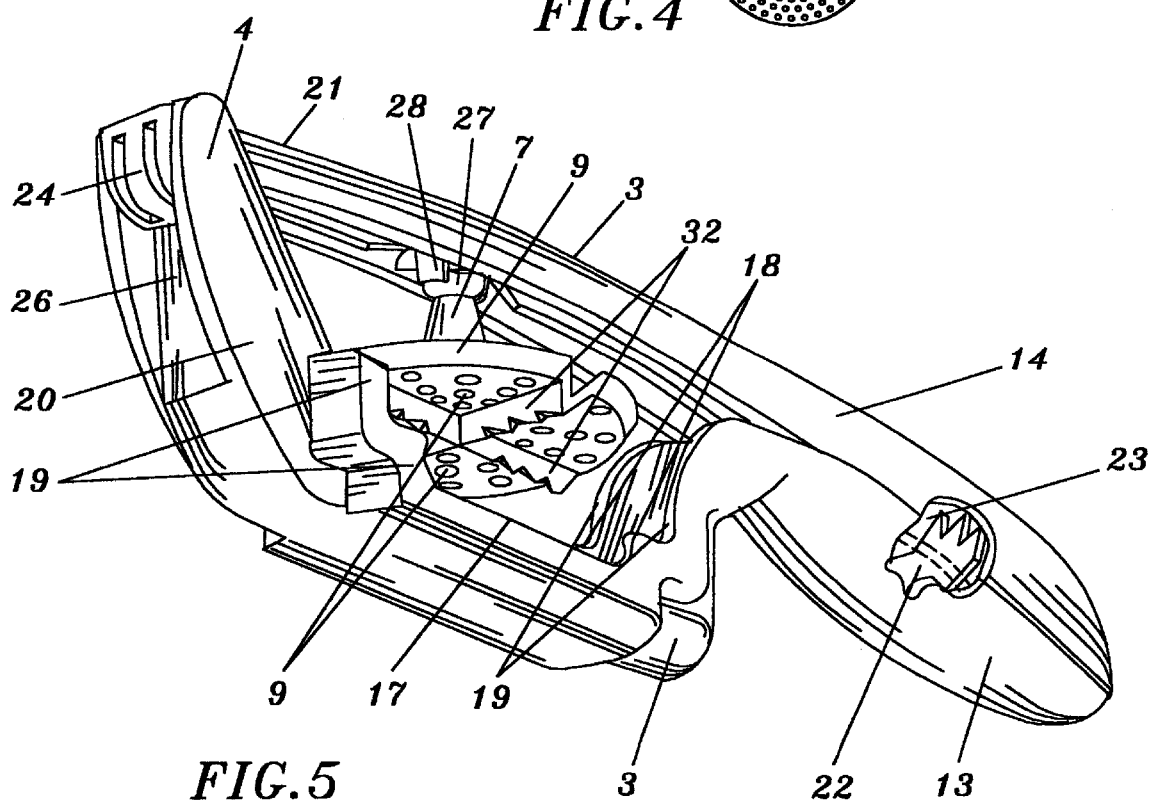
FIG. 5 illustrates a perspective elevation view of an alternate embodiment of the package food fluid extractor with a cut away view of a handle element guide joint.

Referring to FIG. 5, an alternate embodiment with rounded lever arms (13, 14) and a stepped platform (17) is illustrated. The steps (18) may be sized such that particular diameter food containers (6) are retained on the platform (17) by sides (19). In this embodiment the container lever pivot element (20) and compression lever pivot element (21) have been extended in the longitudinal dimension. This configuration reduces the relative rotational motion necessary between the two levers (2, 3) to open the device to insert a food container (6) and then to close them to compress the food (12). While this configuration provides ease of hand gripping to use the device, it reduces the range of motion when used with food susceptible of significant compression. Also illustrated in a cross section cut of the levers (3, 4) is a handle element guide joint (22). The guide joint V-shape rib is formed in one lever arm (13, 14) to receive a rib (23) of the opposite lever arm as the lever arms (13, 14) close together. This provides for alignment as the lever arms (13, 14) close to prevent for example pinching of the user's hand. One or more guide joints (22) may be used.

Figure 6:
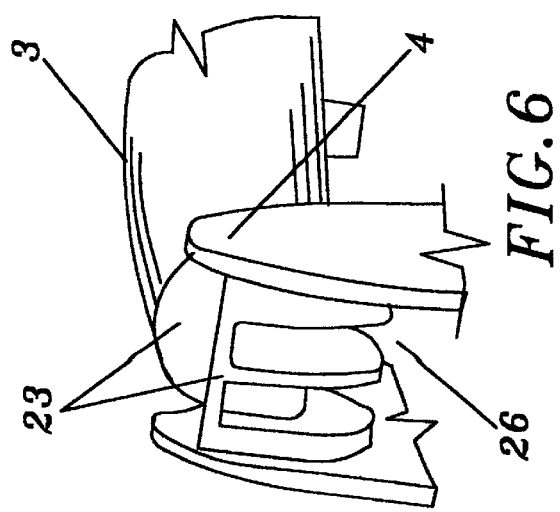
FIG. 6 illustrates a partial view of the alternate pivot point.
Figure 7:
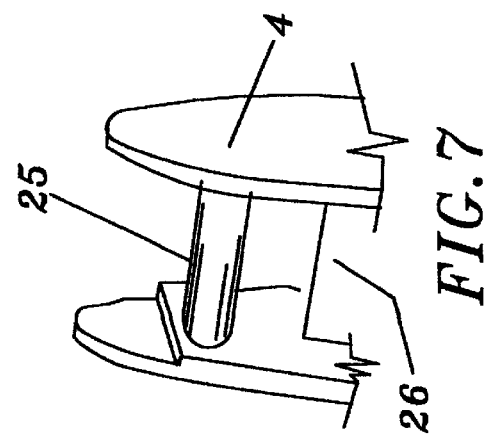
FIG. 7 illustrates a partial view of the alternate pivot point post.

Referring to FIGS. 5 through 7, an alternate pivot point (4) is illustrated having a hook (24) and post (25). The hook (24) element may contact ridge (26) to cause a friction contact which serves to retain the levers (2, 3) in relative position one to the other as set by the user.

Figure 8:
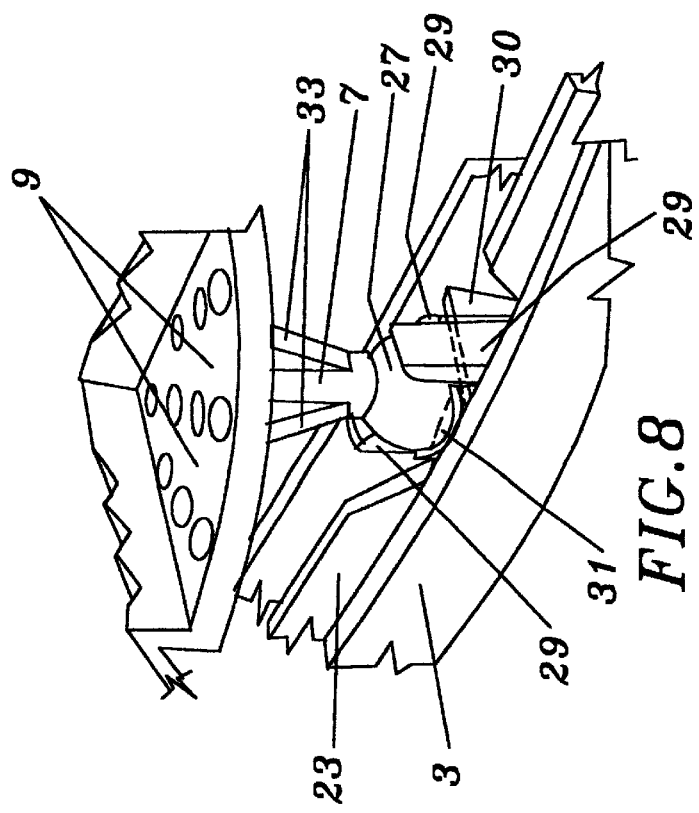
FIG. 8 illustrates a partial inverted elevation view of the perforated disk with piston and ball joint attachment.

Referring to FIGS. 5 and 8, an alternate perforated disk (9) with an attached piston (7) wherein they may be formed as one molding is illustrated. The piston has a partial ball end (27) for insertion in socket (28). This ball joint (29) provides rotational attachment to compression lever (3). The ball joint (29) may be designed to allow ball end (27) to be inserted and removed from the socket (28) under adequate force. This provides for use of a variety of shapes of perforated disks (9). To guide the rotation of the perforated disk (9) and piston (7) such that it is oriented to enter the container, a cross rib (30) and longitudinal partial rib (31) may be formed in a T-shape. With the partial ball end (27) flat portion in contact with these ribs the piston (7) may only rotate toward the pivot point (4) and not side-to-side or away from vertical toward the lever arms (13, 14).

The perforated disk (9) may be constructed with troughs (32). These provide a wedge to spread the food (12) under compression which aids in efficiency of compression. The troughs (32) also serve as conduits for removal of fluids. Support ribs (33) may be attached for strength of the attachment between piston (7) and perforated disk (9).

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device for extracting fluid from food in a container comprising:

a container lever rotatably attached at a pivot and planar with a compression lever;

the compression lever having a removable piston rotatably attached thereto by a ball joint at a top end of the piston a perforated disk attached at a bottom end of the piston;

the ball joint comprising a socket and a removable ball end wherein the socket is formed in the compression lever and the removable ball end is formed at the top of the piston; the removable ball end having a flat surface element for engagement with a cross rib and a partial rib formed in the compression lever such that the piston is only rotatable toward the pivot with respect to a vertical position of the piston; and the container lever having a recess defined therein with a platform for holding a food container.

2. The device as in claim 1 wherein the perforated disk having a plurality of radial troughs.

3. The device as in claim 1 wherein a guide is formed in one lever and a rib is formed in an opposite lever.

4. The device as in claim 1 wherein the platform having a step pair formed therein with each step having opposing sides dimensionally formed for retention of an approximate diameter size food container.

5. The device as in claim 1 wherein the container lever and compression lever are rotatably attached by a hook element formed on the compression lever interlocked with a post element formed on the container lever; and the hook element in partial contract with a contact ridge formed on the container lever such that there is a friction contact when the hook element is rotated sufficient to retain the compression lever in which it is placed.

* * * * *